United States Patent [19]

Cunniff

[11] 4,295,763
[45] Oct. 20, 1981

[54] PLUG CUTTER

[76] Inventor: James J. Cunniff, 46 Lynnrich Dr., Thomaston, Conn. 06787

[21] Appl. No.: 43,364

[22] Filed: May 29, 1979

Related U.S. Application Data

[63] Continuation-in-part of Ser. No. 960,603, Nov. 14, 1978, abandoned.

[51] Int. Cl.³ .............................................. B27C 5/00
[52] U.S. Cl. ..................... 408/86; 408/112; 408/96; 408/192; 408/196; 408/204; 408/207; 408/203.5; 144/24
[58] Field of Search ............ 408/203.5, 204, 67, 408/68, 207, 219, 220, 189, 196, 86, 112, 96, 192, 195, 206; 144/23, 219, 220, 24

[56] References Cited

U.S. PATENT DOCUMENTS

| 91,225 | 6/1869 | Gibson | 408/204 X |
| 2,829,543 | 4/1958 | Bergstrom | 408/207 X |
| 3,564,946 | 2/1971 | Käser | 408/207 X |
| 4,193,721 | 3/1980 | Hougen | 408/204 X |

Primary Examiner—Willie G. Abercrombie
Attorney, Agent, or Firm—McCormick, Paulding & Huber

[57] ABSTRACT

A cutter for use in making plugs of wood or the like to be used in the insulation industry for plugging holes made in order to provide insulation in an existing structure. The cutter is adapted to be held in a chuck or the like for rotation about a central axis defined by a holder, with a pilot being spring biased in the holder and having a centering tit for locating the wooden plug as it is being cut. Four steel cutters are provided in circumaxially spaced relationship around the axis, and two of these are oriented at a slightly different angle than the other two such that the plug can be cut with two distinct tapers, such that the steeper plug taper permits the plug to be first located in the hole to be plugged, and a shallower slightly larger diameter tapered portion for securing the plug in the hole. Each cutter is adjustable in the holder, and is held in place by a screw with any number of shims being provided in order to cut plugs of different size.

17 Claims, 7 Drawing Figures

U.S. Patent  Oct. 20, 1981  4,295,763
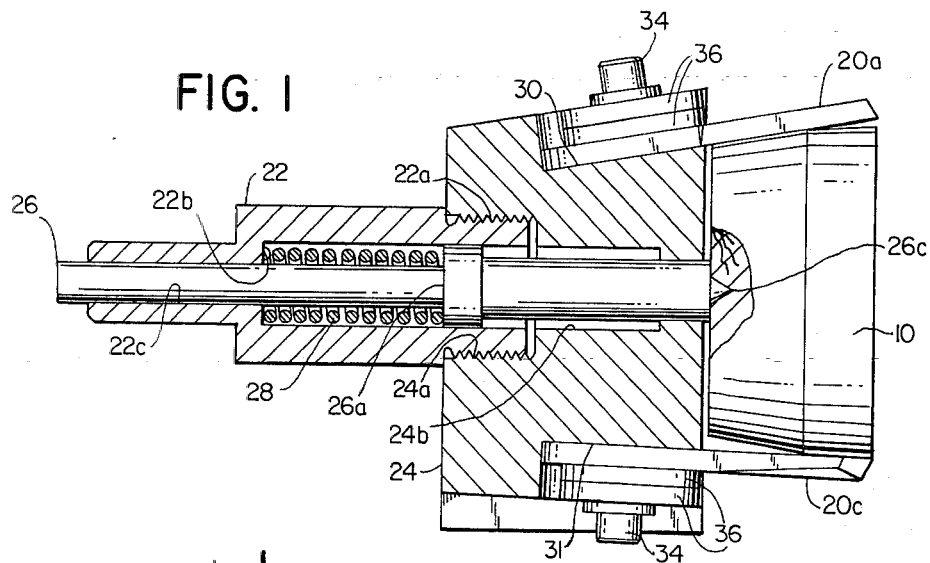
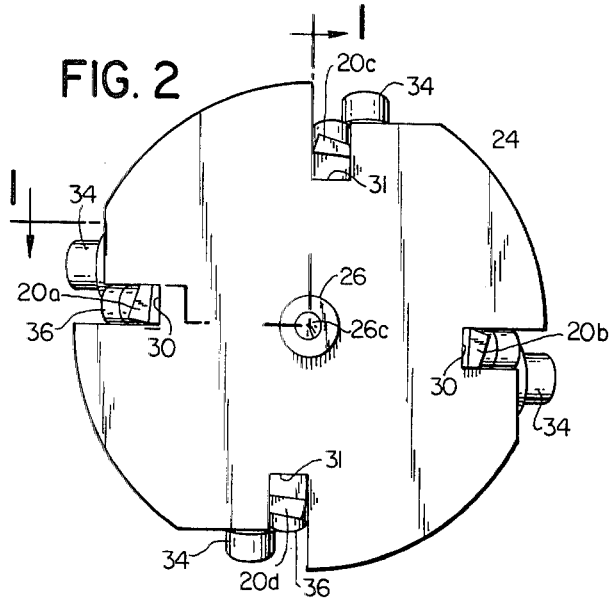
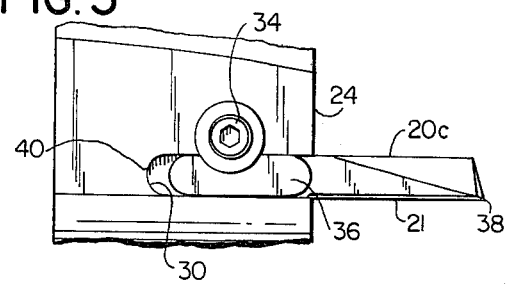
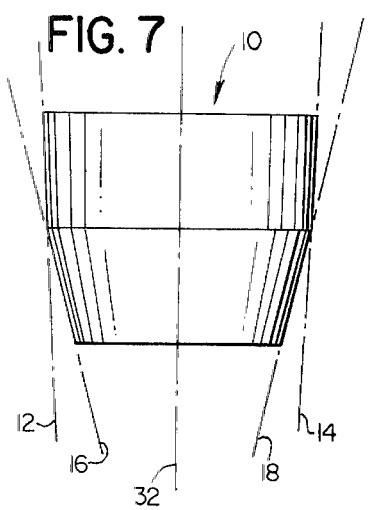
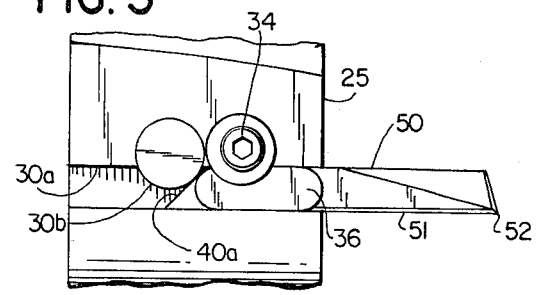
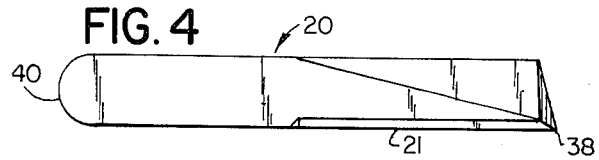
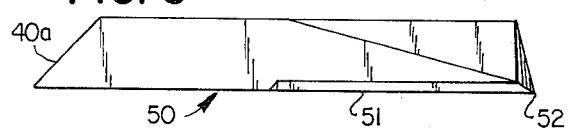

PLUG CUTTER

CROSS REFERENCE TO RELATED APPLICATION

This application is a continuation-in-part of application Ser. No. 960,603 of the same title filed Nov. 14, 1978 by the inventor herein now abandoned.

SUMMARY OF THE INVENTION

This invention relates generally to rotary cutters, and deals more particularly with a cutter designed to cut a double taper on a plug of wood or the like, and to permit cutting plugs of various diameters, and tapers. A novel blade mounting arrangement is also provided.

In summary, the plug cutter of the present invention is adapted for use in a conventional drill press or the like and includes a holder having one portion adapted to be held in the drill press spindle, as for example by a chuck, for rotation on an axis coincident with the drill press spindle. A second portion of the holder is threadably received on the first portion and defines two pairs of sockets, each socket having a land oriented at a particular angle with respect to the axis of rotation. These lands are oriented at mutually related angles such that cutting blades provided in the sockets are adapted to form a double tapered plug. Each cutting blade has an inner portion adapted to be received in the socket, and a projecting portion which does the cutting, and means is provided for securing the blades in these sockets. Shims are provided in order to mount the blades in any number of different positions relative to the axis of the holder so that plugs of various diameters can be cut. These shims are provided in several different thicknesses such that one can simply locate the desired number of shims between the socket land and the blade in order to provide a versatile holder capable of cutting plugs of double taper in any desired diameter or size.

BRIEF DESCRIPTION OF THE DRAWING

FIG. 1 is a sectional view taken generally on the line 1—1 of FIG. 2, to illustrate two of the four cutting blades, which two blades are oriented at two different angles with respect to the axis, or center line of the holder. A plug is shown with a portion broken away to illustrate the complete pilot pin of the holder.

FIG. 2 is an end view of the holder illustrated in FIG. 1.

FIG. 3 is a plan view of one blade in the holder of FIG. 1, and also shows the blade socket and shim.

FIG. 4 is a plan view of one of the cutting blades shown in FIG. 1 but drawn to a slightly larger scale.

FIG. 5 is a plan view of a cutting blade in a holder similar to that of FIG. 1 but with a slightly different blade socket configuration.

FIG. 6 is a plan view of the cutting blade illustrated in FIG. 5 drawn to a slightly larger scale.

FIG. 7 is a side view of a typical plug cut with the plug cutter of FIG. 1, or FIG. 5 and illustrates in phantom lines the relationship between the four cutting blades associated with either of the plug cutters of FIGS. 1-4 and FIGS. 5-6.

DETAILED DESCRIPTION

Turning now to the drawing in greater detail, FIG. 7 shows a plug 10 which is of circular cross section, and has a double taper defined by the mutually related pairs of lines 12 and 14, and 16 and 18. These lines are arranged symmetricaly in pairs with respect to the center line or axis of the plug 10, and represent the longitudinally extending cutting edges of the cutting blades (as for example 20 in FIG. 4) which blades are held in the holder of FIG. 1 in accordance with the present invention such that the holder can be mounted in a conventional drill press for purposes of producing plugs of this type.

The holder of FIG. 1 has one portion 22 adapted to be held for rotation on a central axis coincident with the spindle of a drill press or the like, and a second portion 24 defining an internally threaded bore 24a such that the externally threaded end portion 22a of the portion 22 can be assembled with the portion 22 as shown in FIG. 1.

These portions 22 and 24 of the holder of FIG. 1 cooperate with one another to define a central opening 22c and 24b in which a pilot pin 26 best shown in FIG. 3 is slidably received. This pin 26 defines a flange 26a for engaging a compression spring 28 surrounding the pilot pin, which spring also engages a shoulder 22b on the portion 22 of the holder. The pilot pin 26 also includes a projection or locating tit 26c for engaging and centering the work piece in the form of a plug 10 in order to position the work piece with respect to the cutting blades as the plug is formed. Pilot pin 26 normally projects well beyond the ends of the blades 20, 20 so that the work piece will compress spring 28 as the plug is cut to the shape shown. The plug 10 represents the final shape for the work piece.

The cutting blades 20, 20 shown in FIG. 4 are arranged circumaxially in the holder portion 24 of FIGS. 1 and 2, and each blade is held in an associated socket defined for this purpose in the holder portion 24 such that diametrically opposed blades 20a and 20b of FIG. 2 are symmetrically arranged with respect to the center line or axis of the holder, and a second pair of symmetrically arranged blades 20c and 20d are arranged in associated sockets spaced 90 degrees from the first mentioned pair. Actually, each blade, 20a through 20d inclusively, is preferably of identical construction, and as illustrated in FIG. 4, but the sockets associated with these blades are not identical, but arranged in symmetrical pairs in order to provide their associated cutting edges in the configuration illustrated schematically in FIG. 7 by the lines 12 through 18 inclusively. More particularly, the cutting blade 20a is provided in an associated slot 30 in the holder portion 24, which slot or socket has an inner surface or land oriented at a particular angle with respect to the central axis of the holder. The angular relationship between this land for the slot or socket 30 corresponds in FIG. 7 to the angular orientation associated collectively with the lines 16 and 18 with respect to the center line 32. For example, the blade 20a of FIG. 1 corresponds to the inclination of line 16 in FIG. 7 whereas its opposite blade 20b corresponds to the inclination of line 18 in FIG. 7. Lines 12 and 14 in FIG. 7 correspond to the cutting edges of blades 20c and 20d in FIG. 2.

Means is provided for securing the cutting blades in their associated sockets, and cap screws 34, 34 have washers associated therewith to clamp shims or spacers 36, 36, and hence the blades themselves in place. The inner ends of these cap screws 34, 34 are threadably received in the holder portion 24. Each blade has a cutting edge 21 and a pointed tip as shown at 38 in FIG. 4 with a rake angle as indicated in that view for the cutting tip. The inner end of the blade may be of semicircular contour as shown at 40 in FIG. 4, and the slot or socket in which the blade is mounted is preferably formed with a complementary shape as shown in FIG. 3 at 30 so as to snugly receive the blade, and to permit the blade to be clamped securely in position by means of the screw 34.

The inner surface or land of each socket or slot 30 in which an associated blade 20 is so secured is preferably oriented at a particular angle with respect to the center line or axis of the holder, and it is an important feature of the present invention that these blades are arranged in pairs, with each pair of blade sockets having its associated inner surface or land at a different angle.

I have found that the shallower angled socket 31, 31 associated with the blades 20c and 20d may be advantageously arranged at a 2 degree angle, while the more steeply inclined blade pair 20a and 20b is preferably arranged at an 8 degree angle with respect to the center line or axis of the holder in order to form a plug suitable for the insulation industry. In any event, and whatever angles are chosen for these paired blade sockets, it will be apparent that the blades can be mounted directly in their associated sockets for purpose of cutting a plug of a predetermined size, and that the shims 36, 36 can be provided in equal numbers between the lands 30 and 31 and the associated blades to produce plugs of somewhat larger size.

Furthermore, the holder portion 24 can be conveniently removed and replaced with a larger head should the need arise to fabricate plugs of larger size than that possible with the head of FIG. 1. In such a case, it may be advantageous to provide more than two pairs of cutters in associated sockets defined for this purpose in such a holder portion. For example, instead of four cutting blades arranged circumaxially in the holder of FIG. 7 it is well within the purview of my invention to provide a holder which would accommodate more than four blades as for example 6 or 8 blades. Such a configuration would permit making plugs with surfaces of revolution in 3 or 4 steps along the axial length of the plug.

Turning next to the alternative holder blade socket construction of FIG. 5, I have found that the holder portion 25 can be formed with a through slot 30a instead of the precisely milled semi-circular slots 30, 31 of the holder portion 24. A cylindrical plug 30b is permanently mounted alongside slot 30a so that the angled end 40a of blade 50 (shown in FIG. 6 to larger scale) will permit blade 50 to be precisely located in the slot 30a of FIG. 5 just as the blade 20c of FIG. 3 is located in slot 30 in the previously described embodiment of my invention.

I claim:

1. A plug cutter adapted for use in a drill press or the like, said cutter comprising
    a holder having one portion adapted to be held for rotation on an axis coincident with the spindle of a drill press, and a second portion defining at least two symmetrically arranged sets of sockets with lands of each set circumaxially spaced and oriented at the same angle to said axis, each set having lands oriented at different angles with respect to said axis,
    cutting blades with portions adapted to be received in said sockets and having projecting portions extending beyond said holder in parallel relationship to said lands to produce a multitapered plug, and
    means for securing said blades in said sockets.

2. The plug cutter of claim 1 further characterized by shims for said blades in order to vary the radial distance between said axis and said cutting blades.

3. The plug cutter of claim 2 further characterized by a pilot pin reciprocably mounted in said holder for limited movement along said axis and defining a tit for engaging the work piece to be cut by said projecting blades.

4. The plug cutter of claim 3 further characterized by a spring acting between said holder and said pilot pin to urge the tit into engagement with the work piece being cut.

5. The plug cutter of claim 1 wherein said holder second portion is removably mounted on said holder first portion.

6. The plug cutter of claim 1 wherein each of said holder sockets is more particularly defined by a second land oriented at right angles to said angled land to locate said cutting blade therein.

7. A plug cutter adapted for use in a drill press or the like, said cutter comprising
    a holder having one portion adapted to be held for rotation on an axis coincident with the spindle of a drill press, and a second portion defining at least two symmetrically arranged sets of sockets with lands of each set circumaxially spaced and oriented at the same angle to said axis, each set having lands oriented at different angles with respect to said axis,
    cutting blades with portions adapted to be received in said sockets and having projecting portions extending beyond said holder in parallel relationship to said lands to produce a multi-tapered plug, and
    means for securing said blades in said sockets,
    said sockets comprise four in number and being symmetrically arranged circumaxially in said holder to provide at least two pairs of cutting blades, each blade in said pair oriented at the same angle to said axis, and each blade pair oriented at different angles to produce a double tapered plug work piece.

8. The plug cutter of claim 7 further characterized by shims for said blades in order to vary the radial distance between said axis and said cutting blades.

9. The plug cutter of claim 8 further characterized by a pilot pin reciprocably mounted in said holder for limited movement along said axis and defining a tit for engaging the work piece to be cut by said projecting blades.

10. The plug cutter of claim 9 further characterized by a spring acting between said holder and said pilot pin to urge the tit into engagement with the work piece being cut.

11. The plug cutter of claim 10 wherein said holder second portion is removably mounted on said holder first portion.

12. The plug cutter of claim 11 wherein each of said holder sockets is more particularly defined by a second land oriented at right angles to said angled land to locate said cutting blade therein.

13. A plug cutter for use in a drill press or the like, said cutter comprising
    a holder having one portion adapted to be held for rotation on an axis coincident with the spindle of a drill press, and a second portion defining at least two sockets with angularly oriented lands inclined with respect to said axis,
    cutting blades with portions adapted to be received in said sockets and having projecting portions extending beyond said holder in parallel relationship to said lands, means for securing said blades in said sockets, each holder socket more particularly defined by a through slot extending from an outer end of said holder through to an inner end thereof, said socket slot having opposed side lands cooperating with said inclined land to slidably receive said cutting blade, and locating means, defined in part by a plug fixed in said holder alongside said socket slot, and in part by the inner end of said blade to locate the blade in the holder.

14. The plug cutter of claim 13 further characterized by shims for said blades in order to vary the radial distance between said axis and said cutting blades.

15. The plug cutter of claim 14 further characterized by a pilot pin reciprocably mounted in said holder for limited movement along said axis and defining a tit for engaging the work piece to be cut by said projecting blades.

16. The plug cutter of claim 15 further characterized by a spring acting between said holder and said pilot pin to urge the tit into engagement with the work piece being cut.

17. The plug cutter of claim 13 wherein said holder second portion is removably mounted on said holder first portion.

* * * * *